United States Patent [19]

Harms

[11] 4,187,179
[45] Feb. 5, 1980

[54] ELECTRICALLY GROUNDED FILTER PLATE

[76] Inventor: John F. Harms, 705 Waterway Dr., North Palm Beach, Fla. 33403

[21] Appl. No.: 933,189

[22] Filed: Aug. 14, 1978

[51] Int. Cl.² .......................................... B01D 27/08
[52] U.S. Cl. .................................. 210/238; 210/243; 210/323 T
[58] Field of Search ............ 210/237, 238, 243, 323 T

[56] References Cited

U.S. PATENT DOCUMENTS

| | | | |
|---|---|---|---|
| 1,651,983 | 12/1927 | Zimmerman et al. | 210/243 X |
| 1,926,115 | 9/1933 | Seymoor | 210/243 |
| 2,212,647 | 8/1940 | Nugent | 210/238 X |
| 2,316,206 | 4/1943 | Wilson | 210/238 |
| 2,523,083 | 9/1950 | Witkowski | 173/162 |
| 3,186,551 | 6/1965 | Dornauf | 210/233 |
| 3,280,372 | 10/1966 | De Pew | 220/DIG. 33 |
| 3,615,016 | 10/1971 | Soriente et al. | 210/323 T |
| 3,667,611 | 6/1972 | Pansini | 210/244 |
| 3,676,568 | 7/1972 | Foak | 174/49 |
| 3,680,031 | 7/1972 | Schumacher | 174/51 X |
| 3,720,322 | 3/1973 | Harms | 210/238 |
| 3,928,155 | 12/1975 | Woodhouse | 204/150 |
| 3,929,641 | 3/1973 | Dukek | 210/73 |
| 3,933,643 | 1/1976 | Colvin | 210/243 |
| 3,992,897 | 11/1976 | Loos | 174/51 X |

*Primary Examiner*—John Adee

[57] ABSTRACT

A closed filter container containing at least one filter cartridge mounted on a plate, whose periphery is clamped between the lid and rim of said container electrically isolating said cartridge and plate from the walls including the lid of the container as disclosed in applicant Harms' prior U.S. Pat. No. 3,720,322. Mounted between the plate and a wall of the container is at least one electrically conducting resilient finger which maintains electrical contact across the gasket which isolates the plate and cartridges regardless of the flexing of the plate due to variations of pressure inside the container. The plate also is provided with three handle members to facilitate removal of the plate and cartridges from the container. The three handle members also act as legs to stably support the plate and cartridges during replacement of the cartridges. Furthermore, these handles have improved configurations for both ease in handling and strengthening.

14 Claims, 10 Drawing Figures

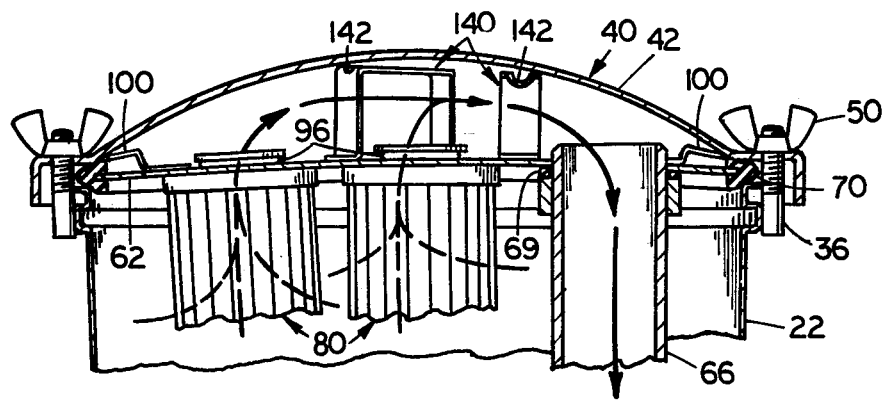
FIG. II
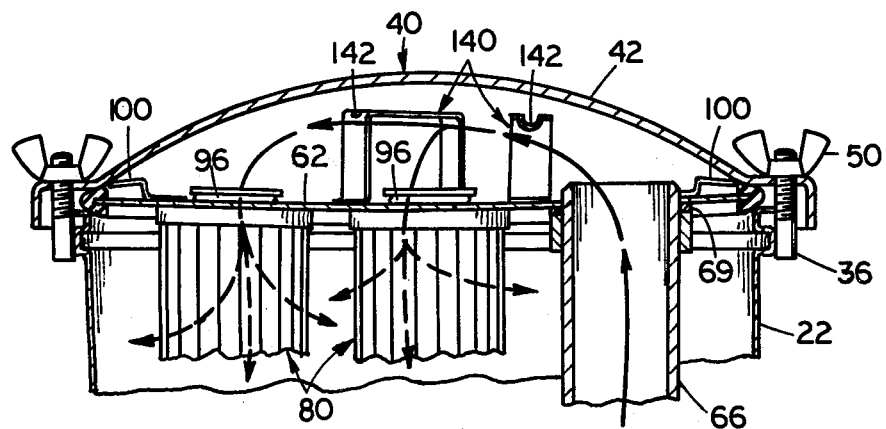
FIG. III
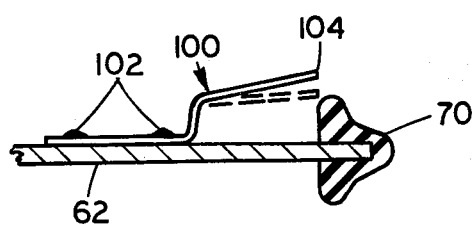
FIG. IV

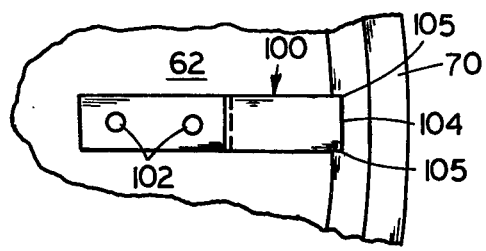
FIG. V
FIG. VI
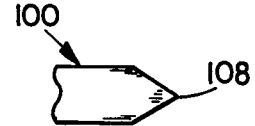
FIG. VII
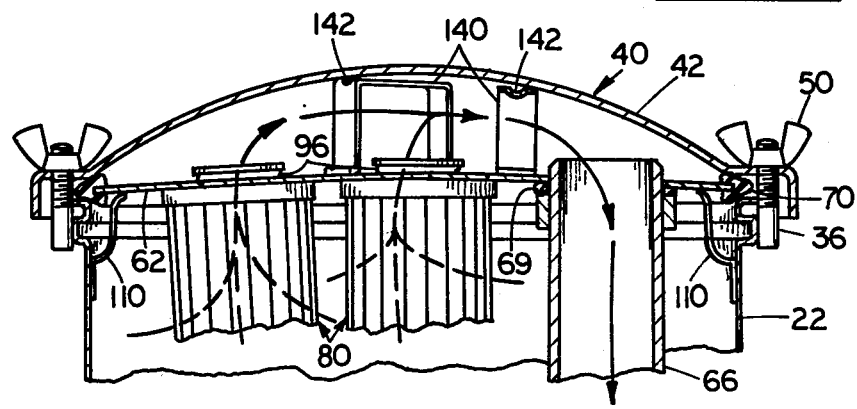
FIG. VIII
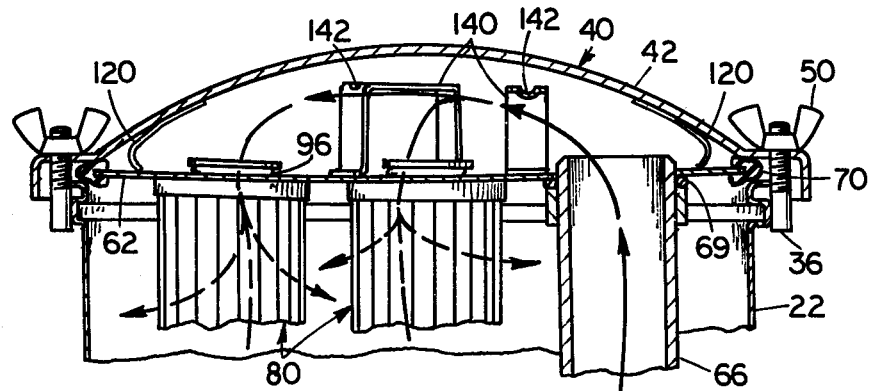
FIG. IX

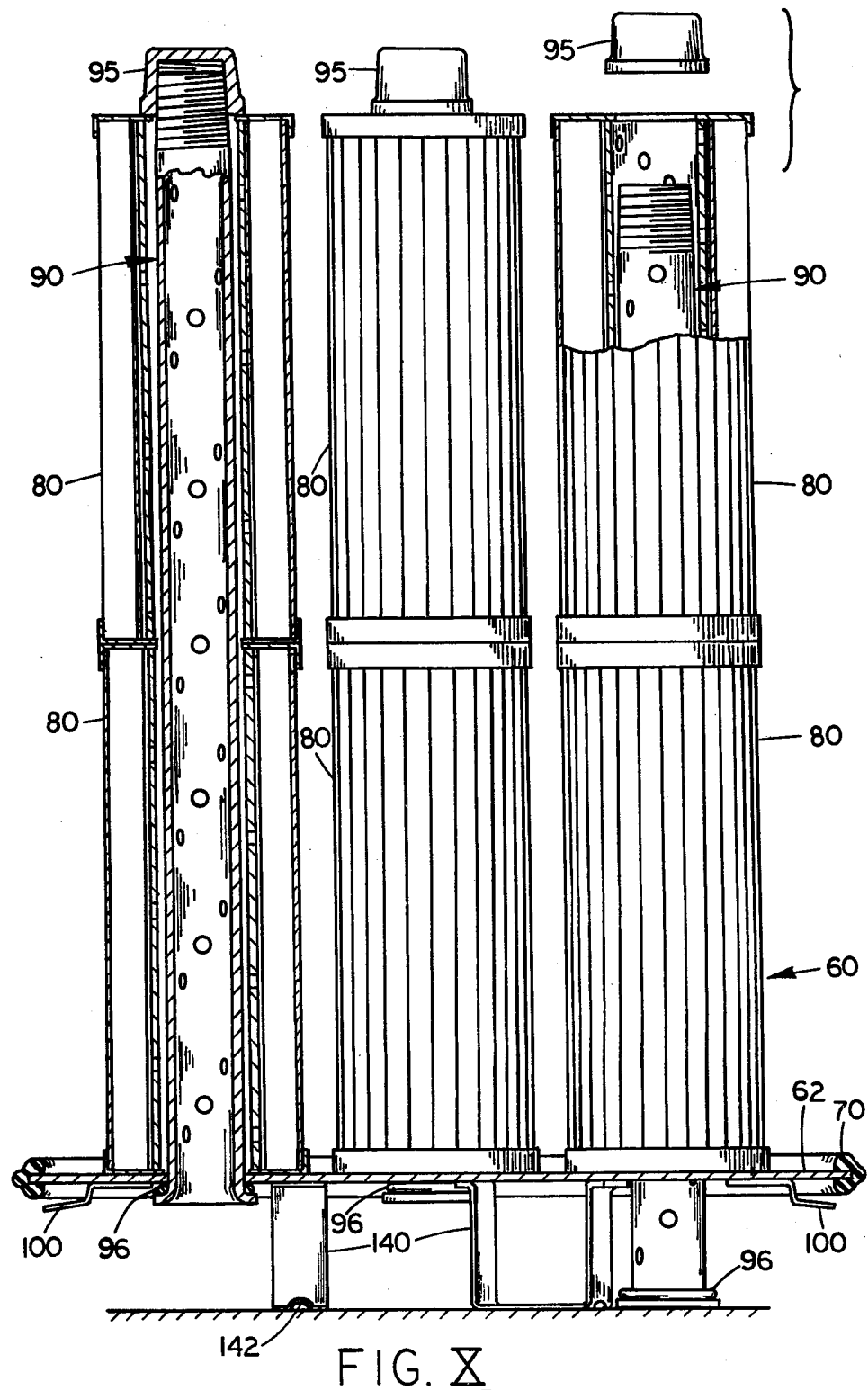
FIG. X

ELECTRICALLY GROUNDED FILTER PLATE

BACKGROUND OF THE INVENTION

It has been found in the passage of liquids through the swimming pool filter shown in applicant Harms's U.S. Pat. No. 3,720,322, issued Mar. 13, 1973, that the friction of the passage of the liquid through the filter builds up an electrostatic charge between the walls of the filter container and the electrically isolated metal plate that supports the cartridges. This is particularly the case for liquids containing ions, slight amounts of salt, and/or liquids not having a neutral pH of 7. This built-up electrostatic charge is discharged by arcing between the plate and the walls of the filter container or the handles on the plate and lid of the container, which arcing eats out or erodes the metal in the plate, handles, and/or container, even to forming holes causing the liquids to bypass the plate, and/or leak from the container, defeating the filtering operation.

This arcing, pitting and eroding of the metal in the plate, lid and side walls of the filter container around the gasket which isolates the plate that supports the cartridges, occurs whether or not pressure is employed in the container. Often times when the container is pressurized, the plate is flexed so that there is less distance or even contact between the tops of the handles and the lid or cover of the container, but this is not maintained when the pump is shut off, or a negative pressure occurs. Such a negative pressure or suction occurs when the filters are backwashed and/or mounted above the surface of the water in the swimming pool, and the back-pressure or suction due to the drop in the height of the water in the filter container above that in the pool, flexes the cartridge plates so that their handles are spaced away from the lid of the filter and thus aid in increasing an electrostatic potential which can be built up between the plate and the walls of the filter container, causing stronger arcing and resulting deeper pitting.

Accordingly, it is the purpose of this invention to prevent the build-up of such electrostatic charges and thus reduce the erosion of the metal parts of a filter due to arcing of such charges.

SUMMARY OF THE INVENTION

This invention is an improvement for the swimming pool type filter disclosed in applicant's prior U.S. Pat. No. 3,720,322 issued Mar. 13, 1973, both in the handles for the removal of the filter cartridge assembly and in the electrostatic grounding of this assembly to the walls of the filter container.

Generally speaking, the filter of this invention comprises a closed container, one end of which is a removable cover sealable by gasket means to the rim of the open end of the container. The gasket means supports and electrically isolates a mounting plate upon which one or more filter cartridges are mounted. The liquid to be filtered is usually pumped into the cartridge-containing chamber partitioned by the supporting plate, so that the liquid is forced through the cartridges which have hollow centers positioned over perforated tubes that communicate through apertures in the supporting plate with an outlet chamber formed between the plate and the cover, and thence through an outlet duct which may be from the lid or from the plate back through the cartridge chamber to a hole in the bottom or side of the container. Since the cartridge filters need to be replaced from time to time when they become clogged, torn or worn, the lid or cover for the container may be unclamped, removed, and the plate upon which the cartridges are mounted then also may be removed from the container. This assembly of cartridges on the plate usually is placed in an inverted position from that normally employed in the filter container so that the cartridges can readily be slipped on and off their perforated tubes. The cartridge mounting plate or container partition is also usually provided with handles for easy removal of the assembly of cartridges from the container. Since the chamber for dirty liquid must be separated and sealed from the clean liquid chamber in the container, a resilient gasket means is provided around the periphery of this mounting plate between both the cover or lid and the rim of the container. Separate wing nuts and bolts are provided around the container rim or lid for clamping this gasket and plate between the lid and rim to seal the plate as a partition in the filter container, as well as sealing the lid on the container.

One of the improvements of this invention comprises at least one and preferably a plurality of spring fingers or electrically bridging the gasket or gap between the plate and either/or both the lid and container walls to avoid the build-up of electrostatic charge between the plate and the container walls due to the flow of liquid through the filter. Thus arcing is prevented between the plate and the container walls or its lid, which arcing caused pitting and erosion of both the plate and the container walls, eventually requiring their replacement. The bridging means may be one or more resilient metal or spring fingers which are fixedly and electrically connected at one of their ends to the plate, or a container wall, with its other sharp edge end resiliently scratching or gouging an electrical contact with a container wall, or the plate, respectively. Thus this resilient electrically conductive finger bridges the insulated space formed by the gasket to ground the plate, and prevent any build-up of an electrostatic charge between the plate and the walls of the filter container. Accordingly, when the filter cartridges are assembled on their supporting plate and the plate is placed in the filter container and the lid is clamped and sealed on the container, an electrical contact between the plate and the walls of the filter container is insured, regardless of any flexing of the plate due to changes in position and/or negative pressure in the two parts or chambers formed by the partition plate in the filter container. The fixed end of the resilient spring fingers may be welded to the plate or container wall, preferably the lid or cover, to be away from easy scratching contact with the person replacing the filter cartridges. Also, these spacing fingers must be of sufficient resiliency that once the plate and cartridges are installed in the filter container, the bending of the fingers in response to such installation will cause intimate gouging or scratching contact of the sharp edges of the fingers with either the container wall or the plate.

Another improvement of this invention is in the configuration and number of handles used on the plate. Since this plate mounts the cartridges which must be periodically replaced, it is easier if the whole assembly is inverted so as to rest on these handles as supporting legs when the assembly is removed from the filter container. Thus, three substantially equally spaced and equal height arch-shaped handles are provided on the plate to act as legs and form a stable support during the operation of replacing the cartridges after unscrewing the caps on the perforated tubes that hold them in place. Furthermore, it has been found that if these handles are slightly curved in cross-section at the base of their U-shapes to fit better the contour of one's hand or fingers, such a curved cross-section both strengthens the handles and avoids sharp edges which could puncture or cut one's skin when the assembly is lifted.

OBJECTS AND ADVANTAGES

It is an object of this invention to produce an efficient, effective, economic, simple, strong, easy to operate, and non-eroding filter assembly.

Another object is to produce a liquid filter in which the filter cartridges and their supporting plate are grounded to the filter chamber to prevent the build-up of electrostatic charges and arcing erosion of the metal parts of the filter assembly and housing.

Another object is to provide stable and strong supporting handles that also act as stable supporting legs for a cartridge filter assembly plate during replacement of the cartridges thereon.

BRIEF DESCRIPTION OF THE DRAWINGS

The above mentioned and other features, objects and advantages and a manner of attaining them are described more specifically below by reference to embodiments of the invention shown in the accompanying drawings, wherein.

Figure 1:
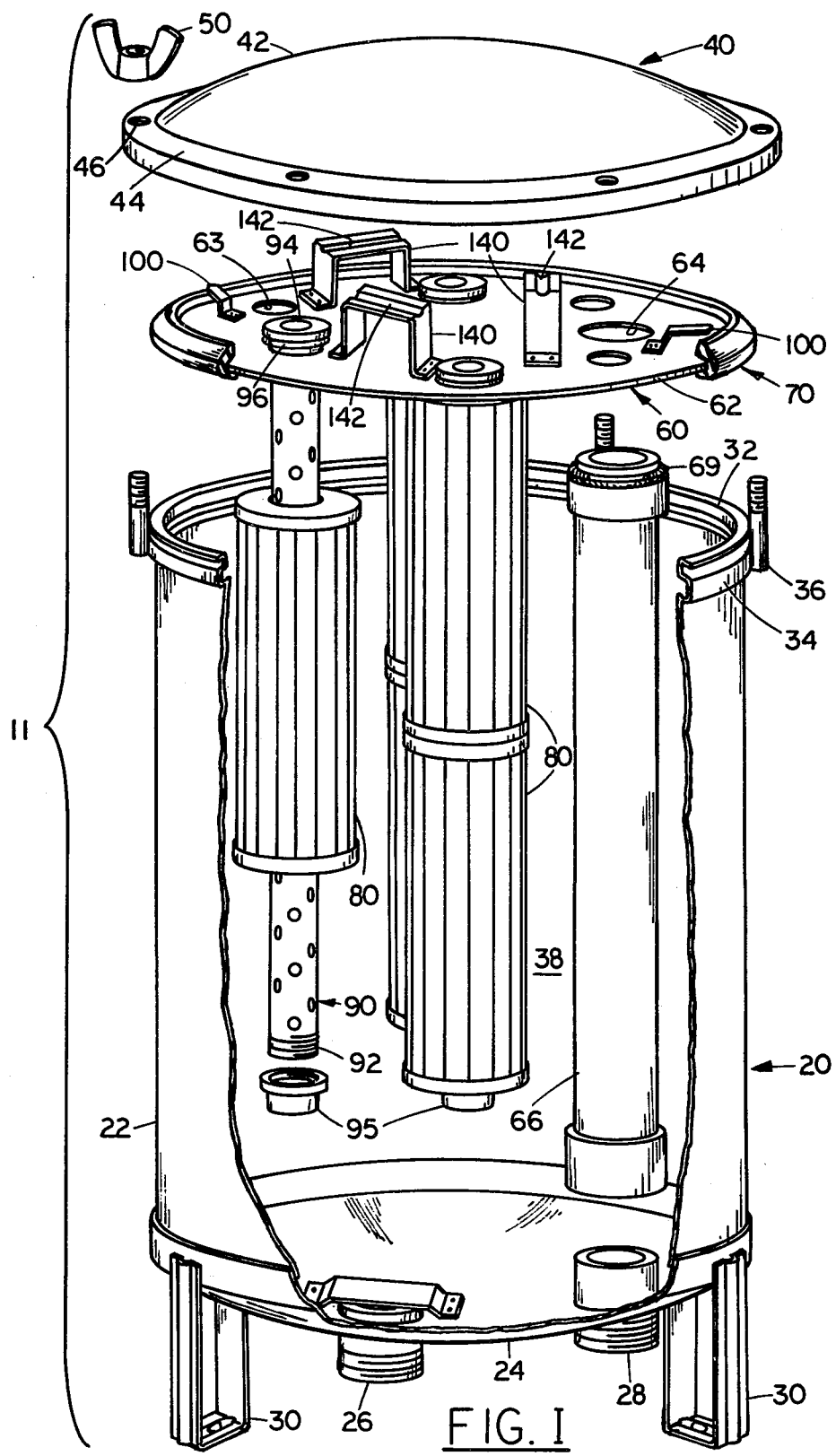
FIG. 1 is an exploded perspective view with parts broken away of one embodiment of a swimming pool type filter embodying the improvements of this invention.

FIG. II is a cross-sectional view of the upper part of the assembled filter container shown in FIG. I during a filtering operation;

FIG. III is a cross-sectional view similar to FIG. II during a negative pressure or non-filtering operation condition;

FIG. IV is an enlarged sectional view of one embodiment of an electrically conducting resilient finger mounted on a cartridge filter supporting plate for bridging the isolating gasket around said plate to a wall of a container for a filter of the type shown in FIG. I;

FIG. V is a plan view of the resilient finger shown in FIG. IV;

FIGS. VI and VII are plan views of other shaped scratching ends of the finger shown in FIGS. IV and V;

FIG. VIII is a view similar to that shown in FIG. II showing another embodiment of the bridging fingers mounted on the side wall of the container for the filter;

FIG. IX is of a view similar to FIG. III of a further embodiment of the bridging fingers mounted on the lid of the container for the filter; and FIG. X is a view of the filter assembly of cartridges mounted on their supporting plate which assembly has been removed from the container for the filter shown in FIG. I and is resting on the handles on the plate, parts of which assembly are shown in section and shows one perforated tube in disassembly.

DETAILED DESCRIPTION OF PREFERRED EMBODIMENTS

I. Filter

Referring first to FIG. I, there is shown an exploded swimming pool type of filter 11 comprising a metal container 20, such as of stainless steel, having cylindrical side walls 22, a concave bottom 24, an inlet duct 26 in the bottom and an outlet duct 24 also in the bottom. Around the bottom are shown a plurality of legs 30, preferably three for stability. Around the open peripheral rim 32 are provided a plurality of preferably evenly angularly spaced threaded studs 36 which may be welded to an outwardly extending peripheral rib 34. These studs 36 extend upwardly or outwardly from the rim 32 and are used for attachment of the cover or lid 40 for the container 20. This cover 40 herein is shown to comprise a peripheral flange 44 around a domed central portion 42. The flange 44 is provided with a plurality of apertures 46 into which the studs 36 extend and upon which studs 36 wing nuts 50 are screwed for clamping the lid or cover 40 to the rim 32.

In between the flange 44 of the cover 40 and the rim 32 of the container 20 is an assembly 60 of filter cartridges 80 supported on a partition plate 62. This plate 62 contains a plurality of apertures 63 and 64 and a peripheral gasket 70. This gasket 70 is clamped between the rim 32 and flange 44 by the wing nuts 50 for hermetically sealing the filtering chamber in the container 20 from domed outlet chamber in the cover 40, as well as to seal the container 20. The hollow filter cartridges 80 are slid over perforated tubes 90 threaded at their lower or outer ends 92 for caps 95 which hold the cartridges 80 in place, the other ends of the tubes 90 have flanges 94 sealed by O-rings 96 in the apertures 63 of the plate 62. The larger opening 64 in the plate 62 herein is for the outlet duct 66 sealed thereto by an O-ring 69, which duct 66 connects the outlet chamber in the lid to the outlet duct 28 in the bottom 24 of the container 20. Thus when the lid 40 is removed by the removal of the wing nuts 50, the whole assembly 60 of the filters on the plate 62 may be removed and inverted as shown in FIG. X for easy replacement of the filter cartridges 80.

In the operation of this swimming pool type of filter, the liquid to be filtered is usually introduced into the duct 26 under the positive pressure of a pump, and forced through the replaceable filter cartridges 80. The filtered liquid then passes through the perforations of the tubes 90, up into the outlet chamber between the dome 42 and the plate 62, and thence down through the aperture 64 and duct 66 to the outlet 28. Once the pump is turned off and this particular filter assembly is above the liquid level of the swimming pool, a negative pressure is created in the filter chamber of container 20 by the downward pull on the liquid in this filter to the lower surface of the liquid in the swimming pool. This reversal in pressure also can occur if the filter is backwashed to remove the particles that accumulate on the cartridges. Thus the plate 62 is flexed from the convex positions shown in FIGS. II and VIII to the concave positions shown in FIGS. III and IX, respectively.

II. Electrostatic Bridging Finger

Since the motion of the liquid through the filter 10 described in Section I above often produces an electrostatic charge between the walls 22 including lid 40 of the container 20 and metal supporting plate 62 electrically isolated by the gasket 70, a resilient grounding finger 100, 110 or 120 is provided to electrically bridge this gasket 70. Without such a bridging finger 100, 110 or 120, the build-up of the electrostatic charge causes arcing between the two isolated metal parts, which arcing causes pitting and erosion of the plate 62 and the rim 32 and flange 44 adjacent the gasket 70. Embodiments of one such bridging finger 100 are shown in FIGS. IV through VII, which finger is made of a resilient metal strip preferably bent or offset, such as in the configuration of a "Z", "S", "J", "U" or "C". One end of this strip 100 is fixedly and electrically attached, such as by welding 102, or by rivets or bolts, to one of the parts, while the other end of the strip 100 is free to flex and has a sharp scraping or cutting edge 104, 106 or 108. This edge may comprise a sort of sharpened blade 104 preferably with sharp corner ends 105 as more specifically shown in FIG. V, or may have serrated or toothed end 106 as shown in FIG. VI or just a single pointed end 108 as shown in FIG. VII. These sharp ends or edges on the resilient strips 100, 110 or 120 insure a good electrical gouging contact of the other part regardless of the relative movement during filtering operations between the parts bridged by the fingers 100, 110 amd 120.

One and preferably a plurality of these fingers 100, 110 or 120 are employed in each filter 11, either fixed near the periphery of the plate 62 as shown in FIGS. I through V and X, for scratching bridging contact with the lid 40, or preferably fixed as fingers 120 shown in FIG. IX of "J" shaped configuration fixedly attached to the lid 40 and making resilient scratching contact with the plate 62. Similarly, the fingers 110 shown in FIG. VI may be attached either to the side walls 22 of the container 20 to scratch the underside of the plate 62, or attached to the underside of the plate 62 to scratch inside of the cylindrical walls 22.

It is understood that any one of these fingers, 100, 110 and 120 may have any configuration of a free resilient scratching end including those shown in FIGS. V, VI and VII, and/or may have any strip configuration without departing from the scope of this invention.

III. The Handles

Also mounted on the plate 62 of the assembly 60 are a plurality of preferably three substantially equal height handles 140 which may comprise U-shaped brackets, the outer ends of which are welded or otherwise attached to the plate 62. The base part of these U-handles may have curved cross-sections as shown at 142 so that when they are grabbed by the person that removes the assembly 60 from the container 20, the base of the "U" will fit the hand and fingers of the lifter and any sharp edges on the handle will not cut into the lifter's flesh. Furthermore, this curved cross-section 142 of these U-bracket handles 140 increases their strength.

The fact that three such handle brackets 140 are relatively evenly angularly spaced around the center of each plate 62, enables the whole assembly to be quite stably supported when inverted, as shown in FIG. X for the replacement of the cartridges 80.

Although this particular invention is disclosed in connection with a swimming pool type filter 10, it is to be readily understood that the bridging finger 100 of this invention may be applied to any type of a filter in which the inner part thereof is isolated electrically from an outer part, and the flow of a liquid through the filter builds up an electrostatic charge between these parts.

While there is described above the principles of this invention in connection with specific apparatus, it is to be clearly understood that the description is made only by way of example and not as a limitation to the scope of this invention.

I claim:

1. In a filter having a closed chamber with a removable end wall and a plurality of electrically insulated electrically conductive metal parts relatively movable with respect to each other, wherein one of said metal parts is a removable support for the filter cartridges in said chamber, the improvement comprising: at least one resilient electrically conducting bridging contact means fixedly connected to one of said parts and scratchingly connected to another of said parts, which parts are otherwise electrically insulated with respect to each other, whereby said bridging contact is established when the filter is assembled and said contact is maintained regardless of any flexing of the parts relative to each other due to positive and negative pressures applied in the chamber during its operation and non-operation.

2. A filter according to claim 1 wherein said end wall is one of said metal parts.

3. A filter according to claim 1 wherein said support for the filter cartridge is one of said metal parts.

4. A filter according to claim 3 wherein said resilient contact means has a free end with a sharpened edge for gouging another of said metal parts when said filter is assembled.

5. A filter according to claim 1 wherein said support for the filter cartridges has three substantially equally spaced handles with curved cross-sections.

6. A filter according to claim 5 wherein said handles having their hand-gripping portions all in a common plane spaced from the filter cartridges whereby said handles also can act as legs for stably supporting said support for the filter cartridges outside of said chamber for facilitating replacement of said cartridges.

7. In a cartridge filter having a closed chamber with a removable lid, a plate for supporting filter cartridges in said chamber, gasket means around the periphery of said plate clampable between the rim of said chamber and said lid and electrically isolating said plate from said chamber and lid, and handle means on said plate for facilitating the removal of said plate and said cartridges from said chamber, the improvement comprising: at least one resilient metal bridging strip fixedly connected at one end and scratchingly connected at the other end for forming an electrically conductive connection between said plate and said chamber when said plate is clamped by said lid in said chamber, whereby said strip maintains electrical contact regardless of the relative flexing of said plate in said chamber due to positive and negative pressures applied to said chamber by the liquid passing through said chamber.

8. A filter according to claim 7 wherein said chamber, said lid and said plate are made of electrically conducting material.

9. A filter according to claim 8 wherein said electrical conducting material is stainless steel.

10. A filter according to claim 8 wherein said resilient bridging strip has said one of its ends welded to an electrical conducting material on one side of said gasket and its other end scratches an electrical conducting material on the other side of said gasket in said chamber.

11. A filter according to claim 10 wherein said one end of said strip is welded to said lid and its other end scratches said plate.

12. A filter according to claim 7 wherein said handle means comprises three substantially equally spaced and height handles which provide stable leg supports for said plate and cartridges when removed from said chamber.

13. A filter according to claim 12 wherein said handle means have a curved cross-sectional contour for fitting the grasping fingers of a person's hand.

14. In a cartridge filter having a closed chamber with a removable end wall, a plate supporting a plurality of filter cartridges in said chamber, a gasket means around the periphery of said plate clampable between said end wall and the rim of said chamber and electrically isolating said plate and cartridges from said chamber and said end wall, and handle means on said plate for facilitating the removal of said cartridges and said plate from said chamber, the improvement comprising:

(a) at least one resilient electrically conducting strip means fixedly connected at one end and scratchingly connected at the other end to form an electrically conductive connection between said plate and said end wall regardless of the flexing of said plate due to positive and negative pressures applied to the liquid passing through said filter, and (b) said handle means comprising three substantially equally angularly spaced handles having curved cross-sections.

* * * * *

UNITED STATES PATENT AND TRADEMARK OFFICE
CERTIFICATE OF CORRECTION

PATENT NO. : 4,187,179
DATED : February 5, 1980
INVENTOR(S) : John F. Harms

It is certified that error appears in the above-identified patent and that said Letters Patent are hereby corrected as shown below:

Column 2, line 23, change "or" (first occurrence) to -- for --.

Column 5, line 15, change "amd" to -- and --.

Signed and Sealed this

Tenth Day of June 1980

[SEAL]

Attest:

SIDNEY A. DIAMOND

*Attesting Officer*  *Commissioner of Patents and Trademarks*